United States Patent [19]

Sklar et al.

[11] Patent Number: 5,801,751
[45] Date of Patent: Sep. 1, 1998

[54] DISTRIBUTION OF SATELLITE TELEVISION PROGRAMS TO PASSENGERS IN AN AIRCRAFT WHEN IT IS OUT OF RANGE OF THE SATELLITES

[75] Inventors: Richard E. Sklar, Huntington Beach; Lawrence E. Girard, Westminster, both of Calif.

[73] Assignee: Hughes Electronics, Los Angeles, Calif.

[21] Appl. No.: 667,224

[22] Filed: Jun. 19, 1996

[51] Int. Cl.$^6$ .................................................. H04N 7/16
[52] U.S. Cl. ........................ 348/8; 455/6.3; 342/363; 343/757
[58] Field of Search .................... 348/8, 6, 12, 13, 348/7, 10, 14, 15, 16, 17, 18, 11; 455/289, 293, 6.3, 3.2, 4.2, 5.1, 6.1, 6.2; 343/705, 706, 707, 757, 708, 763; 342/363, 365, 372, 359; H04N 7/16, 7/173, 7/20

[56] References Cited

U.S. PATENT DOCUMENTS

| | | | |
|---|---|---|---|
| 4,958,381 | 9/1990 | Toyoshima | 348/8 |
| 5,146,234 | 9/1992 | Lalezari | 343/895 |
| 5,249,303 | 9/1993 | Goeken | 455/33.4 |
| 5,289,272 | 2/1994 | Rabowsky et al. | 348/8 |
| 5,311,302 | 5/1994 | Berry et al. | 348/14 |
| 5,463,656 | 10/1995 | Polivka et al. | 375/200 |
| 5,495,258 | 2/1996 | Muhlhauser et al. | 343/753 |
| 5,524,272 | 6/1996 | Podowski | 455/3.2 |
| 5,555,466 | 9/1996 | Scribner et al. | 348/8 |
| 5,568,484 | 10/1996 | Margis | 348/8 |

FOREIGN PATENT DOCUMENTS

570198 A2  11/1993  European Pat. Off. ......... H04N 7/22

*Primary Examiner*—Christopher C. Grant
*Attorney, Agent, or Firm*—G. S. Grunebach; M. W. Sales; W. K. Denson-Low

[57] ABSTRACT

Systems that distribute live television programs to passengers of an aircraft by way of satellites of a direct broadcast satellite (DBS) system when the aircraft is in range of the satellites and distributes time-delayed television programs when the aircraft is out of range of the satellites. The present invention provides for real-time reception and storage of live television programs in a storage medium (in compressed digital format) and presentation to passengers during that time when the aircraft is within the coverage area of satellites. The stored programming is distributed to the passengers later in the flight, when the aircraft is out of range of the satellites. The stored programming includes all channels transmitted by the satellites. Thus, a large number of programs are made available to the passengers on a time-delay basis. A low-cost system is disclosed that distributes a single television channel to overhead monitors and headphones. A method of providing delayed distribution of television programs from satellites of a direct broadcast satellite system to passengers on an aircraft is also disclosed.

22 Claims, 4 Drawing Sheets

DISTRIBUTION OF SATELLITE TELEVISION PROGRAMS TO PASSENGERS IN AN AIRCRAFT WHEN IT IS OUT OF RANGE OF THE SATELLITES

BACKGROUND

The present invention relates generally to in-flight aircraft entertainment systems, and more particularly, to satellite television systems that distribute television programs to passengers of an aircraft by way of direct broadcast satellites (DBS) when the aircraft is out of range of the satellites.

The assignee of the present invention manufactures in-flight aircraft entertainment systems, such as an APAX-150 digital passenger entertainment system, for example. The APAX-150 system, along with other commercially available systems, distributes audio and video material to passengers derived from a variety of sources. For example, existing aircraft passenger entertainment systems provide passengers with audio generated from audio tape players, movies derived from video tape players, and interactive services such as games, shopping and telecommunications. With the exception of telecommunication services (air-to-ground telephone calls, etc), all existing services utilize on-board sources (tape players, etc.) to provide the viewable content.

According to polls of airline passengers, there is strong interest in live television programming as an entertainment option. This may include news, sporting events, movies and regular commercial programming. Up to now, each airplane has been a closed, self-contained content provider, in the sense that once off the ground, all entertainment is generated from within the aircraft. This has precluded the offering of live television. Now, with the advance in live broadcast satellite technology, it is possible to provide this desired service to the flying passenger.

An article was published by Jim C. Williams entitled "Airborne Satellite Television" published in the Fourth Quarter 1994 issue of Avion magazine at pages 43 54 that generally describes broadcasting of television programming to aircraft by way of satellites. Another article in that magazine entitled "MPEG The Great Enabler" describes MPEG compression technology which is used in the DIRECTV digital broadcast satellite system to transmit multiple video and audio channels from a ground station to satellite transponders which relay them to ground-based receivers where they are decoded and displayed. These articles are incorporated herein by reference in their entirety.

The articles provide a description of the digital broadcast satellite system and its operation. The "Airborne Satellite Television" article also describes adapting the digital broadcast satellite system to provide live television broadcasts to aircraft. However, while a description is provided regarding a possible system that could be implemented and the problems that needed to be overcome to implement such a system were discussed, no details of an actual system were provided, such as system or component block diagrams, for example. In fact, the article states that a working system was to be developed in the future. The present invention is such a system.

Presently available passenger entertainment systems are only able to provide programming that is self contained on-board the aircraft, and which is stored before the start of the flight. Examples of such entertainment include video and audio tapes, as well as stored games. Television programs, whether live or delayed, is not offered since they cannot be self contained within the aircraft at the start of the flight.

With regard to the present invention, the "Airborne Satellite Television" article states that additional satellites are required to provide trans-oceanic coverage and indicates a number of problems with this arrangement due to differing broadcast standards. The present invention is directed to providing a solution to this problem.

Furthermore, copending patent application Ser. Nos. 08/667,222, filed Jun. 6, 1996, entitled "Airborne Satellite Television System" and, 08/667,225, filed Jun. 19, 1996, entitled "Distribution Of a Large Number of Live Television Programs to Individual Passengers in an Aircraft", both of which are assigned to the assignee of the present invention, describe systems that provide live television programming derived from a direct broadcast satellite system to a passenger aircraft. These inventions assume that the aircraft is in the coverage area of the satellites of the direct broadcast satellite system throughout the entire service period. These invention allow for the presentation of live television programs when the aircraft is in the coverage area of the satellites, but television programming is not available when the aircraft is not in the coverage area.

Accordingly, it is an objective of the present invention to provide for satellite television systems that distribute television programs to passengers of an aircraft by way of direct broadcast satellites when the aircraft is out of range of the satellites.

SUMMARY OF THE INVENTION

To meet the above and other objectives, the present invention is a satellite television system that provides television programming to passengers using direct broadcast satellite (DBS) services when the aircraft is out of range of its satellites. The present invention combines direct broadcast satellite and audio and video entertainment technologies to provide aircraft passengers with delayed in-flight television programming when the aircraft is out of range of the satellites of the DBS system.

The present invention extends the technology described in the above-referenced patent applications to the case where the aircraft is out of the coverage area of the satellites for a portion of the flight. The passengers are provided with live television programming when the aircraft is in the coverage area of the satellites, and time-delayed television programming during that portion of the flight when the aircraft is out of the coverage area of the satellites. The present invention provides for a system wherein time delayed television programming (typically on the order of one to several hours) is provided to the passengers.

More specifically, the satellite television system comprises an antenna that is disposed on the aircraft and pointed at a plurality of satellites that are part of a direct broadcast satellite system. The antenna is controlled by an antenna controller and antenna interface unit that send control signals and process status signals to steer the antenna. The antenna is steered so that it is locked onto RF signals transmitted by the satellite. The antenna interface unit downconverts the received RF signals to provide left hand circularly polarized RF signals and right hand circularly polarized RF signals that contain different sets of television channels.

The present invention may be implemented with any in-flight distributed video system, whether it is interactive or not. It is equally applicable to systems where video is shown on overhead monitors so that each passenger views the same program, and to systems where each passenger has an individual in-seat video monitor and can select from a number of available programs.

In a first embodiment of the present invention, the downconverted RF signals are processed by a receiver to provide encoded (compressed) video and audio signals comprising a plurality of television channels. The receiver does not decode or D/A convert the downconverted signals. The encoded (compressed) video and audio signals containing the plurality of channels are stored in a storage medium such as a hard disk or optical disk, for example.

When the aircraft is within the coverage area of the satellites, the encoded video and audio signals are modulated in a modulator, which also is used as a combiner to modulate signals derived from other video and audio sources, such as video and audio tape players. The modulated and encoded video and audio signals are routed to a video and audio distribution system that distributes the encoded video and audio signals to each passenger's seat. Seat electronics circuitry is located at each passenger's seat that contains a demodulator, decoder, and digital to analog converter. The seat electronics circuitry demodulates, decodes and D/A converts the modulated and encoded video and audio signals into signals that may be viewed and heard by the passenger at that seat.

When the aircraft is not in the coverage area of the satellites, the encoded video and audio signals that have been stored in the storage medium are modulated in the modulator, which also is used as a combiner to modulate signals derived from other video and audio sources. The modulated and encoded video and audio signals are then sent to the video and audio distribution system, and seat electronics circuitry to provide time-delayed television programming to the passengers.

In a second embodiment of the present invention which uses a single set of monitors to display video to all passengers of the aircraft, a receiver is used that outputs a single channel of baseband video and associated analog audio signals. The encoded (compressed) video and audio signals are stored in the storage medium as in the first embodiment, and are also made available for distribution to the video monitors. Later, when the aircraft is not in the coverage area of the satellites, the selected encoded (compressed) video and audio signals that have been stored in the storage medium are processed by the receiver to produce the baseband video and analog audio signals which are displayed for viewing by the remaining components of the system in a time-delayed manner.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
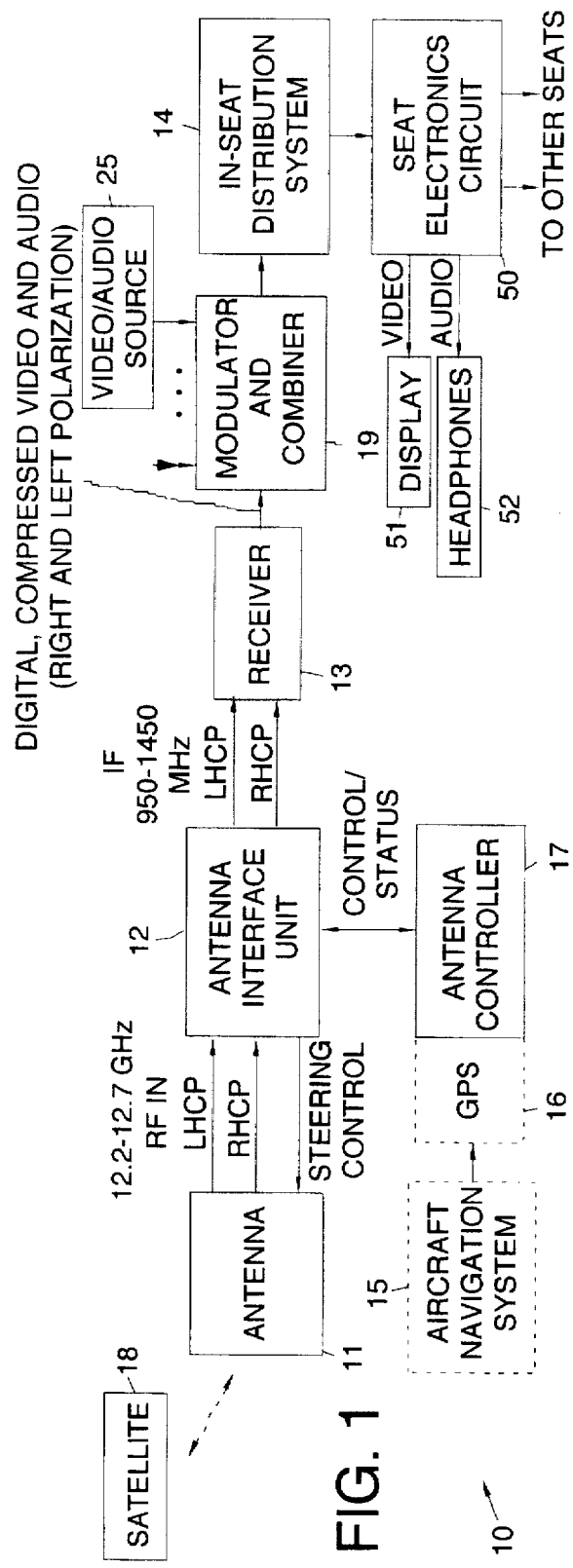
FIG. 1 is a top level block diagram of a first embodiment of a satellite television system in accordance with the principles of the present invention that distributes television programs to passengers of an aircraft by way of direct broadcast satellites when the aircraft is out of range of the satellites.

Referring to the drawing figures, FIG. 1 shows a top level block diagram of a first embodiment of a satellite television system 10 in accordance with the principles of the present invention that distributes television programs to passengers of an aircraft by way of satellites 18 of a direct broadcast satellite (DBS) system when the aircraft is out of range of the satellites 18. The satellites 18 are part of a direct broadcast satellite (DBS) system such as the DIRECTV satellite system, for example.

The basic concept of the present invention involves the real-time reception and storage of live television programs (in compressed digital format) during that time when the aircraft is within the coverage area of satellites 18, and then the distribution of this stored programming to the passengers later in the flight, when the aircraft is out of range of the satellites 18. The stored programming includes all channels transmitted by the satellites 18, numbering approximately 150 for the DIRECTV satellite system. Thus, a large number of programs are made available to the passengers in a time-delay mode.

The satellite television system 10 comprises an antenna 11 that is disposed adjacent the surface of the aircraft. The antenna 11 is pointed at the satellites 18, and is steered so that it is locked onto the RF signal transmitted by the satellites 18. The antenna 11 is controlled by an antenna controller 17 that receives aircraft position and attitude data from the aircraft navigation system 15 or a GPS 16, for example, and sends control signals and processes status signals to and from the antenna 11 by way of an antenna interface unit 12. However, it is to be understood that the antenna 11 may be an electronically steered antenna 11 or a mechanically steered antenna 11. The antenna interface unit 12 downconverts received MPEG encoded (compressed) RF signals to provide left hand circularly polarized RF signals and right hand circularly polarized RF signals that contain different sets of encoded television channels. The received encoded (compressed) RF signals are in the 12.2–12.7 GHz band which are downconverted to IF signals in the 950–1450 MHz band.

The downconverted encoded IF signals are processed by a receiver 13, which does not decode or D/A convert them, to produce encoded video and audio signals corresponding to a plurality of encoded television channels. The encoded (compressed) video and audio signals containing the plurality of channels are stored in a storage medium 13a such as a hard disk or optical disk, for example.

When the aircraft is within the coverage area of the satellites 18, the received encoded video and audio signals corresponding to the plurality of channels are modulated by a modulator 19, which also is used as a combiner, to modulate signals derived from other video and audio sources 25, such as video and audio tape players. The modulated and encoded video and audio signals are then routed to an in-seat video and audio distribution system 14 which distributes them to each passenger's seat.

Seat electronics circuitry 50 is located at each passenger's seat that contains a demodulator 53, MPEG decoder 54 and digital to analog converters 55 (described in detail with reference to FIG. 5). The seat electronics circuitry 50 demodulates, decodes and converts the modulated and encoded video and audio signals into signals that may be viewed and heard by the passenger at that seat by way of a display 51 and head phones 52. A tuner 57 and game hardware 58 may be provided as part of the seat electronics circuitry 50.

When the aircraft is not in the coverage area of the satellites 18, the encoded video and audio signals that were earlier stored in the storage medium 13a are sent by the receiver to the modulator 19, video and audio distribution system 14, and seat electronics circuitry 50 to provide time-delayed television programming to the passengers. Thus, in the first embodiment, the receiver 13 does not generate baseband video or analog audio signals, but sends the encoded audio and video signals to the modulator 19. The seat electronics circuitry 50 provides the required decoding, conversion of the signals to baseband video and analog audio signals, and presentation to the passenger.

More specifically, in operation, the receiver serves to receive IF signals from the antenna 11, but does not provide MPEG decoding or digital-to-analog conversion processes. The output of the receiver 13, rather than a baseband video and analog audio output representing a single television program, includes of two serial data streams, one for each polarization. These MPEG-encoded data streams include all of the live television programming provided by the satellites 18.

The encoded data streams are applied to the RF modulator 19 along with signals from other entertainment sources such as video and audio regarding safety announcements or digital game data, for example. All of these signals are separately modulated and combined onto a single carrier. The resulting signal is distributed to the passengers by means of the in-seat video and audio distribution system 14, which may be an APAX-150 distribution system made by Hughes-Avicom International, for example.

At each passenger seat or seat group, the signal is processed by the seat electronics circuitry 50 wherein it is demodulated and processed appropriately according to individual signal type. For example, the modulated video and audio from video tape players may be applied to a tuner 57 and converted to a form appropriate for use by the seat's display 51 and the passenger's headphones 52. Game data is properly processed and applied to game hardware 58 to allow its use by the passenger. In the case of the MPEG-encoded live or time-delayed television data streams, the subject of the present invention, the MPEG decoder 54 and digital-to-analog converters 55 located within the seat electronics circuitry 50 process the signals and generate baseband video and analog audio for use by the passengers. Since all television channels received from the satellites 18 are contained within the data streams, each passenger can select any particular channel, without affecting other passengers.

An example of the operation of the present invention is a flight leaving the West coast of the United States, heading East and flying over the Atlantic Ocean to Europe. The aircraft would be within the coverage area of the DBS satellites for five or more hours, during which time the digitized television data would be received and stored on board the aircraft. This data includes programming for each of the approximately 150 channels transmitted by the satellites 18. During this phase of the flight, the passengers have real-time access to these programs. After leaving the East coast, the stored television data would be presented to the passengers. Thus, for the remainder of the flight, when the aircraft is out of range of the satellites 18, the passengers still have access to television programming, although it is a time delayed version.

Figure 2:
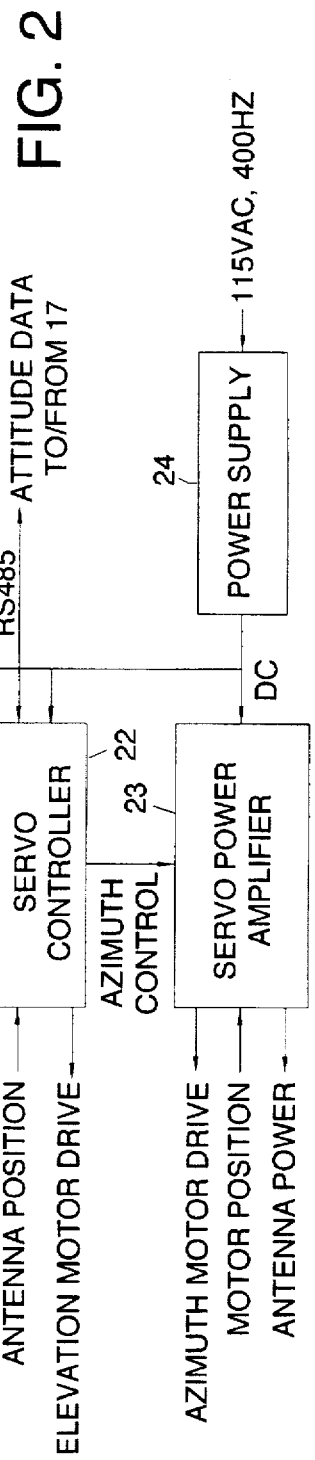
FIG. 2 is a block diagram of an antenna interface unit employed in the system of FIG. 1.

For the purposes of completeness, details of the various components of the system 10 will now be described with reference to FIGS. 2–4. Referring to FIG. 2, it shows a block diagram of one embodiment of the antenna interface unit 12 employed in the system 10 of FIG. 1. The antenna interface unit 12 comprises a downconverter 21 that downconverts the RF signals from the 12.2–12.7 GHz band to the 950–1450 MHz band which are output to the receiver 13. A servo controller 22 is coupled between the antenna controller 17 and the antenna 11. The servo controller 22 processes antenna position signals to generate elevation motor drive signals that are supplied to the antenna 11. The servo controller 22 also outputs azimuth control signals to a servo power amplifier 23 that generates azimuth motor drive signals that are supplied to the antenna 11. Motor position signals are fed from the antenna 11 to the servo power amplifier 23. Power is supplied to the antenna 11 by the servo power amplifier 23. A power supply 24 is provided that converts 115 volt AC power into appropriate DC voltages for the downconverter 21, the servo controller 22 and the servo power amplifier 23.

Figure 3:
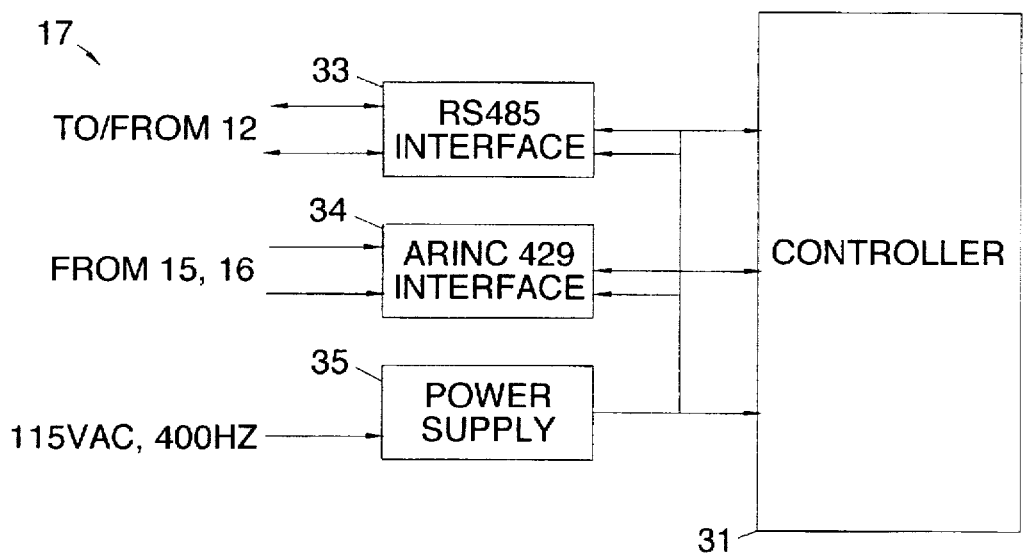
FIG. 3 is a block diagram of an antenna controller employed in the system of FIG. 1.

Referring to FIG. 3, it shows a block diagram of one embodiment of the antenna controller 17 employed in the system 10 of FIG. 1. The antenna controller 17 comprises a controller 31 that is coupled to an RS485 interface 33 and an ARINC 429 interface 34. A power supply 35 is provided that converts 115 volt AC power into appropriate DC voltages for the controller 31, the RS485 interface 33, and the ARINC 429 interface 34. The controller 31 may be an Intel 486 processor, for example. The RS485 interface 33 is coupled between the antenna interface unit 12 and the controller 31 and couples control and status signals thereto. The ARINC 429 interface 34 is coupled between the aircraft navigation system 15 or global positioning system (GPS) 16 and the controller 31 and couples inertial reference signals thereto which is used to accurately steer the antenna 11 toward the satellite 18.

Figure 4:
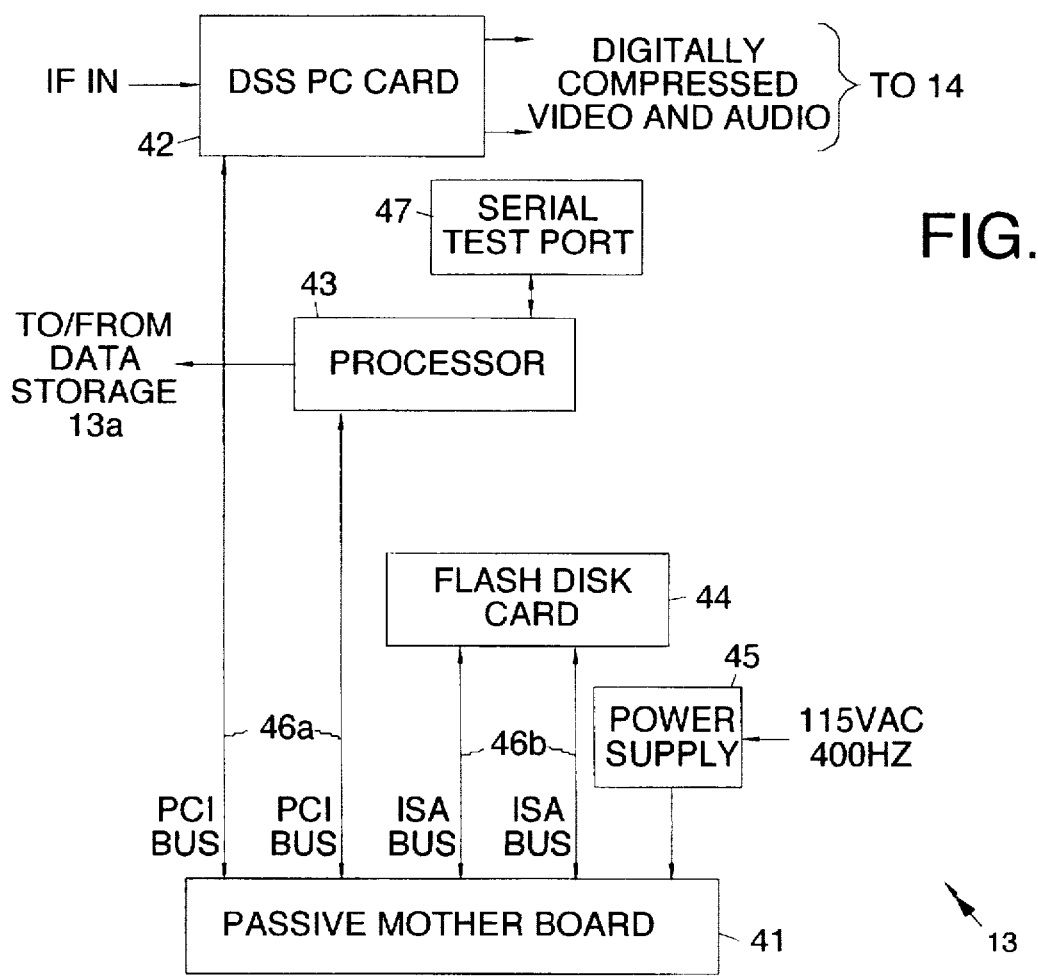
FIG. 4 is a block diagram of a receiver employed in the system of FIG. 1.

Referring to FIG. 4, it shows a block diagram of an embodiment of the receiver 13 employed in the system 10 of FIG. 1. The receiver 13 comprises a passive mother board 41 which has PCI and ISA busses 46a, 46b. A DSS PC card 42, for example, available from Hughes Network Systems and a computer processor 43 are coupled to the PCI bus 46a. The DSS PC card 42 and the computer processor 43 contain electronics and software that are substantially identical to a receiver that is used in commercially available DSS systems, such as those made by RCA, for example. Thus, the DSS PC card 42 and the computer processor 43 perform the functions of the receiver 13.

A rotary switch may 46 be used in a second embodiment of the present invention (FIG. 6) when only one program is distributed to an overhead video system. The rotary switch 46 would be used to select the one program from a few available program choices. In the first embodiment, the programs are selected by individual passengers at their seats, so there is no need for program selection at the receiver 13.

The computer processor 43 also has a serial test port 47 that may be used to test the processor 43 and DSS PC card 42. A flash disk card 44 is coupled to the ISA bus 46b and is used to store data and code in a manner similar to a hard disk. A power supply 45 is coupled to the passive mother board 41 and is used to convert 115 volt AC power into appropriate DC voltages for the DSS PC card 42, the computer processor 43, and the flash disk card 44. The processor 43 communicates with the data storage medium 13a to achieve the storage and retrieval of the encoded (compressed) video and audio signals.

Figure 5:
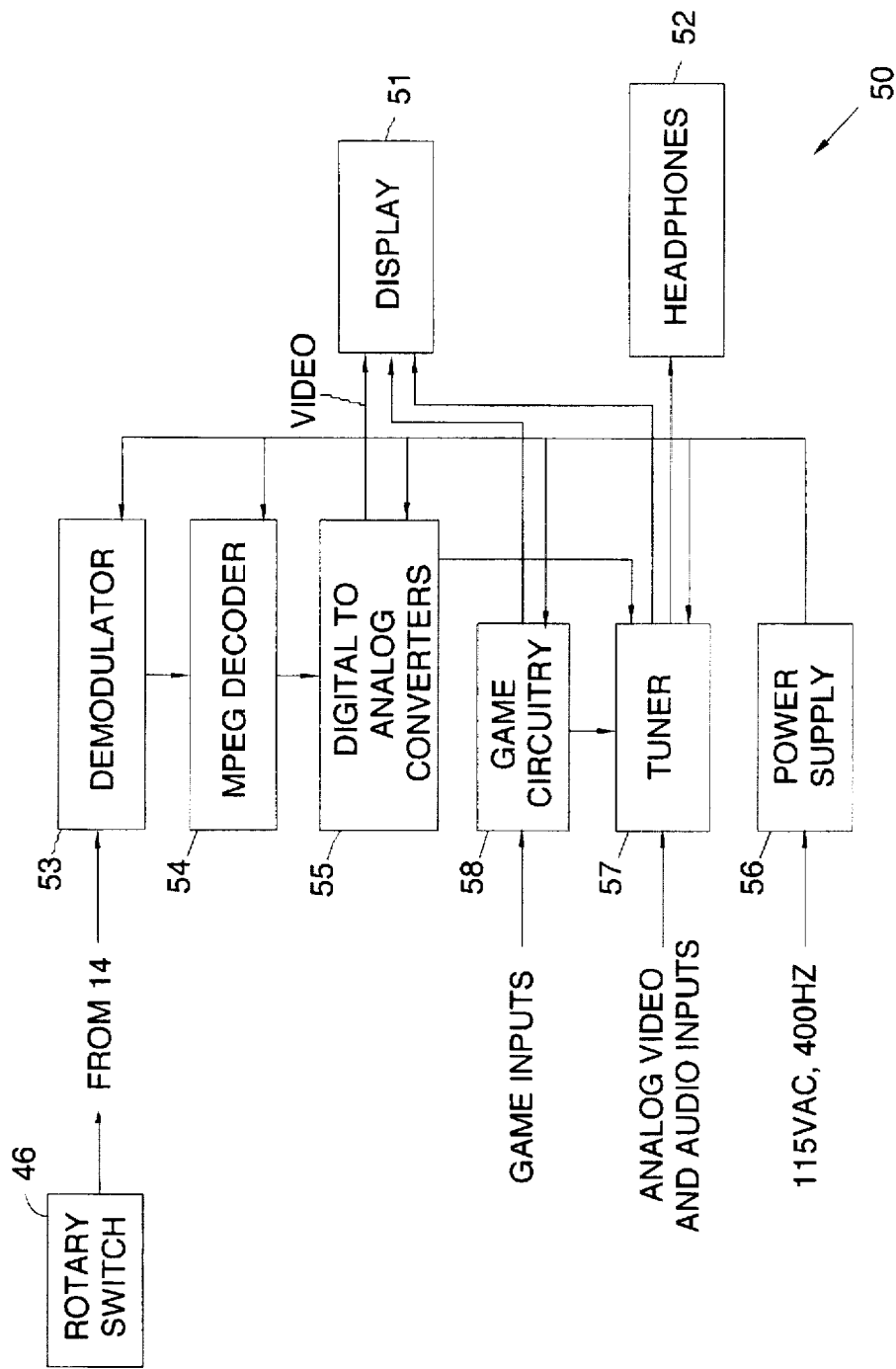
FIG. 5 is a top level block diagram of a seat electronics circuit employed in the system of FIG. 1.

Referring to FIG. 5, it shows a block diagram of one embodiment of the seat electronics circuitry 50 located at each passenger's seat. The seat electronics circuitry 50 includes an MPEG decoder 54, a demodulator 53, digital to analog converters 55, and optional tuner 57 and game electronics circuitry 58. A power supply 56 is provided that converts 115 volt AC power into appropriate DC voltages for the demodulator 53, the MPEG decoder 54, the digital to analog converters 55, the tuner 57 and the game electronics circuitry 58. The seat electronics circuitry 50 demodulates, decodes and converts the modulated and encoded video and audio signals into signals that are viewed and heard by the passenger at that seat by way of the display 51 and the headphones 52.

Figure 6:
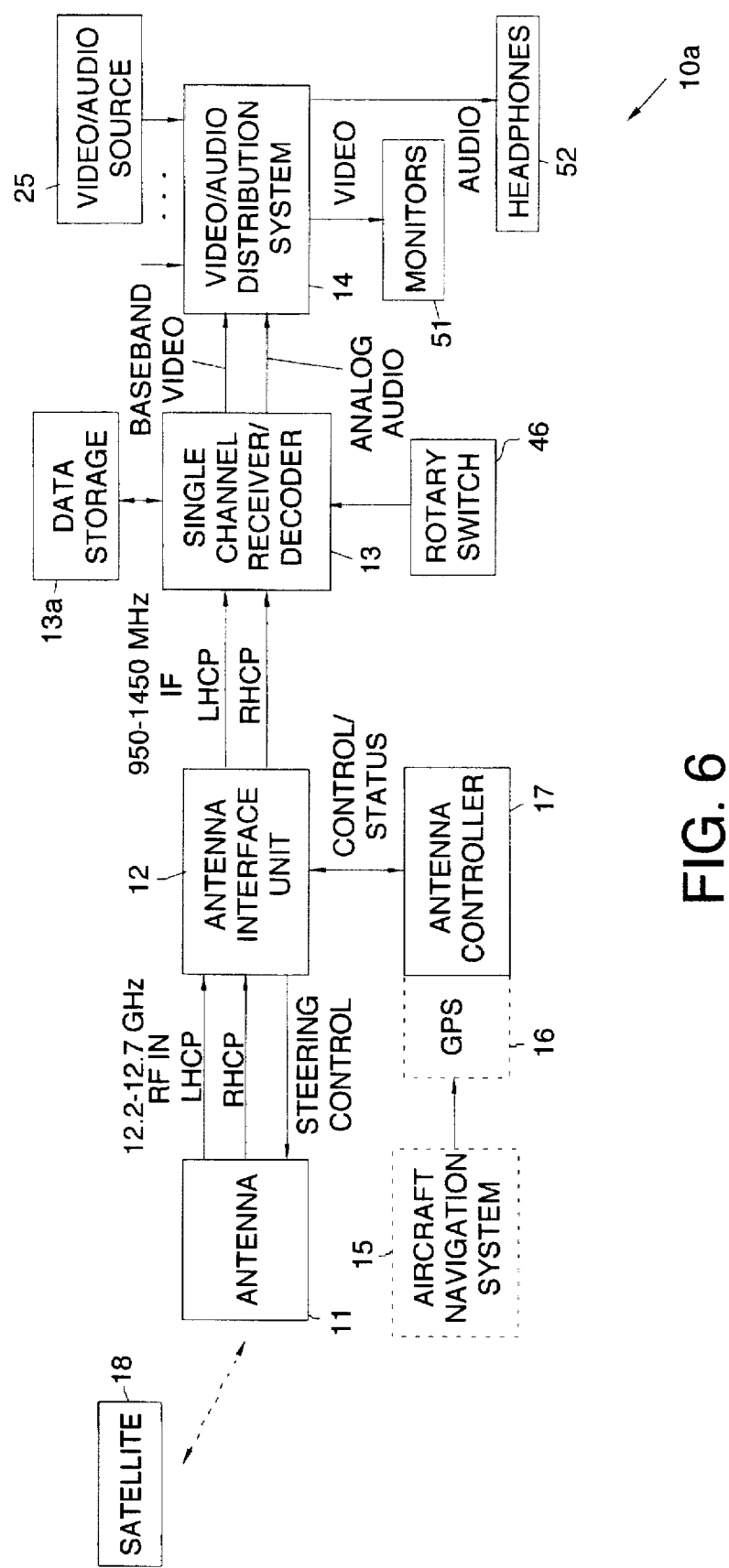
FIG. 6 is a block diagram of a second embodiment of a satellite television system in accordance with the principles of the present invention.

Referring now to FIG. 6, it shows a block diagram of a second embodiment of a satellite television system 10a in accordance with the principles of the present invention. The system 10a of FIG. 6 provides for low-cost distribution of live television programming to overhead monitors 51 in an aircraft when the aircraft is out of range of the DBS satellites 18. This embodiment specifically addresses the case of distribution of television programming where the programming is viewed on overhead monitors 51 mounted throughout the aircraft. In this case, a single television program is viewed by all passengers at the same time. Consequently, this system 10a provides for a low-cost solution to the general distribution case described with reference to the system 10 of FIG. 1.

The system 10a is suitable for aircraft that show video material on overhead monitors 51 mounted throughout the aircraft. Current systems of this type use the overhead monitors 51 to display movies from an on-board video tape player 25. Audio is distributed to each passenger's headset. The system 10a of FIG. 6 provides for low-cost distribution of a single live or time-delayed television program, thus allowing an airline to add this feature without installing a costly upgraded distribution system 14. This embodiment may be implemented in any in-flight distribution system 14 where a single program is presented on overhead monitors 51 mounted throughout the aircraft.

In the embodiment of FIG. 6, a receiver/decoder 13 outputs a single channel of live television which comprises one video output and one audio output. The receiver/decoder 13 receives the IF signal from the antenna interface unit 12, extracts the desired channel, decodes this data and generates baseband video and analog audio output signals. The decoding process that is employed depends upon the type of encoding that is used at the ground-based program source, which may be MPEG compression, for example.

As in the embodiment of FIG. 1, the encoded (compressed) video and audio signals are also stored in a storage medium 13a such as a hard disk or optical disk, for example. When the aircraft is within the coverage area of the satellites 18, the baseband video and audio signals from the receiver 13 are routed to a video and audio distribution system 14 which distributes them to the overhead monitors 51 and to the headphones 52 at each passenger seat. Alternatively, signals from other video and audio sources 25 may be applied to the video and audio distribution system 14.

When the aircraft is not in the coverage area of the satellites 18, the encoded video and audio signals that are stored in the storage medium 13a are processed by the receiver 13 which generates baseband video signals and analog audio signals for a single television channel. The baseband video signals and analog audio signals are then sent to the video and audio distribution system 14, monitors and headphones to provide time delayed television programming to the passengers.

Only a single-channel receiver/decoder 13 is required in the system 10a, since only one television program is shown at a time. The receiver/decoder 13 used in the system 10a disclosed with reference to FIG. 4 employs the rotary switch or other means to select the program to be decoded. The baseband video and analog audio output signals from the receiver/decoder 13 are in the same format as those of the video tape player 25, for example, so that it is entirely compatible with the existing distribution system 14. Therefore, the satellite television system 10a can coexist with other video and audio sources on the aircraft, such as video and audio tape players, for example. The flight crew selects one of the video and audio sources since only one source can be displayed on the overhead monitors 51 at a given time.

Thus, satellite television systems that distribute television programs to passengers of an aircraft by way of direct broadcast satellites when the aircraft is out of range of the satellites have been disclosed.

Furthermore the present invention also provides for a method of providing delayed distribution of television programs from satellites of a direct broadcast satellite system to passengers on an aircraft. This method is self-evident from, and readily understandable by, those skilled in the art from a reading of the present specification.

It is to be understood that the described embodiments are merely illustrative of some of the many specific embodiments which represent applications of the principles of the present invention. Clearly, numerous and varied other arrangements may be readily devised by those skilled in the art without departing from the scope of the invention.

What is claimed is:

1. A satellite television system that distributes television programs to passengers on an aircraft derived from direct broadcast satellites, said system comprising:

an antenna that comprises steering means for steering the antenna toward the satellites in response to control signals supplied thereto;

antenna control means for providing the control signals to the antenna and for processing status signals derived from the antenna to steer the antenna so that it is locked onto encoded RF signals transmitted by the satellite, and for downconverting the encoded RF signals to provide encoded left hand and right hand circularly polarized RF signals that correspond to a plurality of encoded television channels;

a receiver coupled to the antenna control means for processing the downconverted encoded RF signals to provide encoded video and audio output signals corresponding to at least one television channel;

a storage medium coupled to the receiver for storing the encoded video and audio signals;

a modulator coupled to the receiver for selectively modulating the downconverted encoded video and audio signals when the aircraft is within a coverage area of the satellites, and the stored encoded video and audio signals when the aircraft is outside the coverage area of the satellites; and a video and audio distribution system coupled to the modulator for distributing the modulated and encoded video and audio signals for viewing by the passengers.

2. The system of claim 1 wherein the video and audio distribution system comprises seat electronics circuitry that includes a demodulator, a decoder, and a digital to analog converter, for demodulating, decoding and D/A converting the modulated and encoded video and audio signals into signals that may be viewed and heard by the passengers at their seats by way of displays and headphones.

3. The system of claim 1 wherein the video and audio distribution system comprises a plurality of overhead monitors that are viewed by passengers of the aircraft and a plurality of headphones that are used by the passengers to hear the audio signals.

4. The system of claim 1 wherein the modulator comprises a combiner to modulate signals derived from additional video and audio sources.

5. The system of claim 2 wherein the seat electronics circuitry further comprises game electronics for displaying games on the display.

6. The system of claim 1 wherein the antenna control means comprises:
   an antenna controller coupled to the receiver for processing status signals derived therefrom; and
   an antenna interface unit coupled between the antenna and the receiver for downconverting the RF signals to provide the left hand and right hand circularly polarized RF signals that contain different sets of television channels, and coupled between the antenna controller and the antenna for coupling the control and status signals therebetween.

7. The system of claim 6 wherein the antenna controller comprises:
   a controller;
   an RS485 interface coupled between the controller and the antenna interface unit for coupling the control and status signals to the controller; and
   an ARINC 429 interface coupled between the controller and a navigation system for coupling inertial reference signals provided by the navigation system to the controller which are used to generate steering signals that steer the antenna toward the satellite.

8. The system of claim 6 wherein the antenna interface unit comprises:
   a downconverter for downconverting the RF signals received from the antenna and for outputting the downconverted RF signals to the receiver;
   a servo controller coupled between the RS485 interface of the antenna controller and the antenna for processing antenna position signals to generate elevation motor drive signals that are supplied to the antenna, and for outputting azimuth control signals;
   a servo power amplifier coupled between the servo controller and the antenna for supplying power to the antenna, and for processing motor position control signals derived from the antenna and the azimuth control signals derived from the servo controller to generate azimuth motor drive signals that are supplied to the antenna.

9. The system of claim 1 wherein the receiver comprises:
   a passive mother board having first and second computer busses;
   a receiver card coupled to the first computer bus;
   a computer processor coupled to the first computer bus; and
   a rotary switch coupled to the computer processor for selecting channels for viewing.

10. A satellite television system that distributes television programs to passengers on an aircraft derived from direct broadcast satellites, said system comprising:
    an antenna that comprises steering means for steering the antenna toward the satellite in response to control signals supplied thereto;
    antenna control means for providing the control signals to the antenna and for processing status signals derived from the antenna to steer the antenna so that it is locked onto encoded RF signals transmitted by the satellite, and for downconverting the encoded RF signals to provide encoded left hand and right hand circularly polarized RF signals that correspond to a plurality of encoded television channels;
    a receiver coupled to the antenna control means for processing the downconverted encoded RF signals to provide encoded video and audio output signals corresponding to the plurality of television channels, and for feeding back the status signals to the antenna control means which are used to steer the antenna to lock it onto the RF signals received from the satellite;
    a storage medium coupled to the receiver for storing the encoded video and audio signals;
    a modulator coupled to the receiver for selectively modulating the downconverted encoded video and audio signals when the aircraft is within a coverage area of the satellites, and the stored encoded video and audio signals when the aircraft is outside the coverage area of the satellites;
    an in-seat video and audio distribution system coupled to the modulator for distributing the modulated and encoded video and audio signals for viewing by the passengers; and
    seat electronics circuitry coupled to the in-seat video and audio distribution system that comprises a demodulator, a decoder, a digital to analog converter, and a tuner, for demodulating, decoding and D/A converting the modulated and encoded video and audio signals into signals that may be viewed and heard by the passengers at their seats by way of displays and headphones.

11. The system of claim 10 wherein the antenna control means comprises:
    an antenna controller coupled to the receiver for processing status signals derived therefrom; and
    an antenna interface unit coupled between the antenna and the receiver for downconverting the RF signals to provide the left hand and right hand circularly polarized RF signals that contain different sets of television channels, and coupled between the antenna controller and the antenna for coupling the control and status signals therebetween.

12. The system of claim 11 wherein the antenna controller comprises:
    a controller;
    an RS485 interface coupled between the controller and the antenna interface unit for coupling the control and status signals to the controller; and
    an ARINC 429 interface coupled between the controller and a navigation system for coupling inertial reference signals provided by the navigation system to the controller which are used to generate steering signals that steer the antenna toward the satellite.

13. The system of claim 11 wherein the antenna interface unit comprises:
    a downconverter for downconverting the RF signals received from the antenna and for outputting the downconverted RF signals to the receiver;

a servo controller coupled between the RS485 interface of the antenna controller and the antenna for processing antenna position signals to generate elevation motor drive signals that are supplied to the antenna, and for outputting azimuth control signals;

a servo power amplifier coupled between the servo controller and the antenna for supplying power to the antenna, and for processing motor position control signals derived from the antenna and the azimuth control signals derived from the servo controller to generate azimuth motor drive signals that are supplied to the antenna.

14. The system of claim 10 wherein the receiver comprises:

a passive mother board having first and second computer busses;

a receiver card coupled to the first computer bus;

a computer processor coupled to the first computer bus; and a rotary switch coupled to the computer processor for selecting channels for viewing.

15. The system of claim 10 wherein the modulator comprises a combiner to modulate signals from additional video and audio sources.

16. A satellite television system that distributes television programs to passengers on an aircraft derived from direct broadcast satellites, said system comprising:

an antenna that comprises steering means for steering the antenna toward the satellite in response to control signals supplied thereto;

antenna control means for providing the control signals to the antenna and for processing status signals derived from the antenna to steer the antenna so that it is locked onto encoded RF signals transmitted by the satellite, and for downconverting the encoded RF signals to provide encoded left hand and right hand circularly polarized RF signals that correspond to a plurality of encoded television channels;

a receiver coupled to the antenna control means for processing the downconverted encoded RF signals to provide encoded video and audio output signals corresponding to a selected television channel, and for feeding back the status signals to the antenna control means which are used to steer the antenna to lock it onto the RF signals received from the satellite;

a storage medium coupled to the receiver for storing the encoded video and audio signals for the selected television channel;

a modulator coupled to the receiver for selectively modulating the downconverted encoded video and audio signals when the aircraft is within a coverage area of the satellites, and the stored encoded video and audio signals when the aircraft is outside the coverage area of the satellites;

a video and audio distribution system coupled to the modulator for distributing the modulated and encoded video and audio signals for viewing by the passengers.

17. The system of claim 16 wherein the video and audio distribution system comprises a plurality of overhead monitors that are viewed by passengers of the aircraft and a plurality of headphones that are used by the passengers to hear the audio signals.

18. The system of claim 16 wherein the modulator comprises a combiner to modulate signals derived from additional video and audio sources.

19. The system of claim 16 wherein the antenna control means comprises:

an antenna controller coupled to the receiver for processing status signals derived therefrom; and an antenna interface unit coupled between the antenna and the receiver for downconverting the RF signals to provide the left hand and right hand circularly polarized RF signals that contain different sets of television channels, and coupled between the antenna controller and the antenna for coupling the control and status signals therebetween.

20. The system of claim 16 wherein the antenna controller comprises:

a controller;

an RS485 interface coupled between the controller and the antenna interface unit for coupling the control and status signals to the controller; and an ARINC 429 interface coupled between the controller and a navigation system for coupling inertial reference signals provided by the navigation system to the controller which are used to generate steering signals that steer the antenna toward the satellite.

21. The system of claim 16 wherein the antenna interface unit comprises:

a downconverter for downconverting the RF signals received from the antenna and for outputting the downconverted RF signals to the receiver;

a servo controller coupled between the RS485 interface of the antenna controller and the antenna for processing antenna position signals to generate elevation motor drive signals that are supplied to the antenna, and for outputting azimuth control signals;

a servo power amplifier coupled between the servo controller and the antenna for supplying power to the antenna, and for processing motor position control signals derived from the antenna and the azimuth control signals derived from the servo controller to generate azimuth motor drive signals that are supplied to the antenna.

22. Method of providing delayed distribution of television programs from satellites of a direct broadcast satellite system to passengers on an aircraft, said method comprising:

steering an antenna toward the satellites in response to control signals supplied thereto;

providing control signals to the antenna;

processing status signals derived from the antenna to steer the antenna so that it is locked onto encoded RF signals transmitted by the satellite;

downconverting the encoded RF signals to provide encoded left hand and right hand circularly polarized RF signals that correspond to a plurality of encoded television channels;

coupling an antenna control means to a receiver for processing the downconverted encoded RF signals to provide encoded video and audio output signals corresponding to at least one television channel;

coupling a storage medium to the receiver, said storage medium operable to store the encoded video and audio signals;

coupling a modulator to the receiver for selectively modulating the downconverted encoded video and audio signals when the aircraft is within a coverage area of the satellites, and the stored encoded video and audio signals when the aircraft is outside the coverage area of the satellites; and coupling a video and audio distribution system to the modulator for distributing the modulated and encoded video and audio signals for viewing by the passengers.

* * * * *